United States Patent [19]

Manini et al.

[11] 4,062,458
[45] Dec. 13, 1977

[54] APPARATUS FOR STORING OBJECTS ON A VEHICLE

[75] Inventors: Silvio Manini; Antonio Pacciarini, both of Milan, Italy

[73] Assignee: Industrie Pirelli S.p.A., Milan, Italy

[21] Appl. No.: 577,459

[22] Filed: May 14, 1975

[30] Foreign Application Priority Data

June 28, 1974 Italy ................................ 24491/74

[51] Int. Cl.$^2$ ............................................ B65G 47/00
[52] U.S. Cl. ............................. 214/16.4 R; 214/95 R; 214/41 R
[58] Field of Search .............. 214/16.4 R, 95 R, 41 R, 214/16.1 CB, 16.1 CF, 16.6; 198/574, 607

[56] References Cited

U.S. PATENT DOCUMENTS

| 2,058,729 | 10/1936 | Sekulski | 214/16.4 R |
| 2,510,573 | 6/1950 | Gray | 214/16.4 R |
| 2,647,645 | 8/1953 | Pierce | 214/16.4 R |
| 2,707,054 | 4/1955 | Alimanestiano | 214/16.1 CB |
| 3,836,022 | 9/1974 | Ims | 214/41 |

*Primary Examiner*—Robert J. Spar
*Assistant Examiner*—R. B. Johnson
*Attorney, Agent, or Firm*—Stevens, Davis, Miller & Mosher

[57] ABSTRACT

A method and apparatus are provided for receiving a length or section of a tire tread or the like and transferring it to a storage means. The apparatus has a cylindrical member which receives the section from an extruder or other source, inverts the section and deposits it on a first endless conveyor. A second conveyor is looped about the downstream roller of the first endless belt and receives the section from the first belt. A vertically movable carriage has an endless belt which carries the section from the second belt to a storage means. A slide member movable in the same direction as the endless belt is provided for transferring a section from the carriage to a storage surface.

13 Claims, 7 Drawing Figures

APPARATUS FOR STORING OBJECTS ON A VEHICLE

The present invention relates to a method and a machine, as well as a complete plant, for taking up sections of elastomeric material from a plane, where they arrive continuously and regularly, for instance from the outlet of any plant for treating the same, and then for transporting and storing them in another place, for instance a storing plane or the inlet of another treating plant.

In particular, the method and plant can be very conveniently used for taking up the tread bands from the outlet of an extrusion plant and for their storage on appropriate storing planes.

In fact, according to the present technology, the extruded sections of elastomeric material necessary for building up pneumatic tires, be they tread bands, sidewalls, tubular elements for inner tubes or the like, are extruded by means of an extruder in the form of a continuous element which, sliding on roller planes and dragged by conveyor belts, is then cooled in water tanks and cut into sections of the desired length. The sections are then subjected to other important operations, which are not considered here, since they are not essential for the treatment of the present topic.

The sections, cut in this way, are then taken up by one or more operators, which place them on the so-called "book-type trucks", namely on trucks comprising many rectangular planes, superimposed one on the other in spaced arrangement, each of which rotates about one of the longer sides, the axes of rotation being all situated at the same side, just in order to form "a book", whose "pages" are constituted by the planes.

The two short sides of the planes are secured to the truck frame by means of a pair of return springs, which permit the plane to take two different positions of stable equilibrium, namely a position inclined at about 45° (unloaded plane) and the horizontal position (loaded plane), all the intermediate positions between the two above indicated ones being positions of unstable equilibrium.

In any case, trucks of this type are well known to those skilled in this field.

The sections of elastomeric material remain some hours to season on the planes and, at the time of use, each truck is driven to the proximity of an operating machine which utilizes the sections.

The above described operation shows many serious defects both of technical and economical nature. First of all the section, when it reaches the outlet end of the extrusion plant, in spite of the fact that it is considerably cooler than it was when it emerged from the extruder, is still substantially hot, and therefore has a relevant plasticity. Consequently, the picking up operation, carried out by the operators, and the subsequent laying on the plane of the "book-type" truck, deform the section mostly in the longitudinal direction and to an extent which is the more significant the greater its weight. This is particularly true of sections of vehicle tire tread bands, making therefore partially useless the accurate cutting carried out by the cutter and creating the conditions for a subsequent qualitative decay of the finished tire.

Moreover, the operation is uneconomical, since it requires the employment of costly labor. The cost increases rapidly with the increase of the section weight, since the number of operators required for the job increases while the number of sections handled in the time unit decreases at the same time.

On the other hand, the operation is mechanical and repeated, and therefore it has all the necessary characteristics to be advantageously mechanised.

An object of the present invention is to provide a method and an apparatus for performing the above described operation mechanically while eliminating all of the above indicated disadvantages.

Other objects will become apparent from the following description with reference to the accompanying drawing wherein FIG. 1 is a diagrammatic view of the complete plant provided by the invention;

Figure 1:
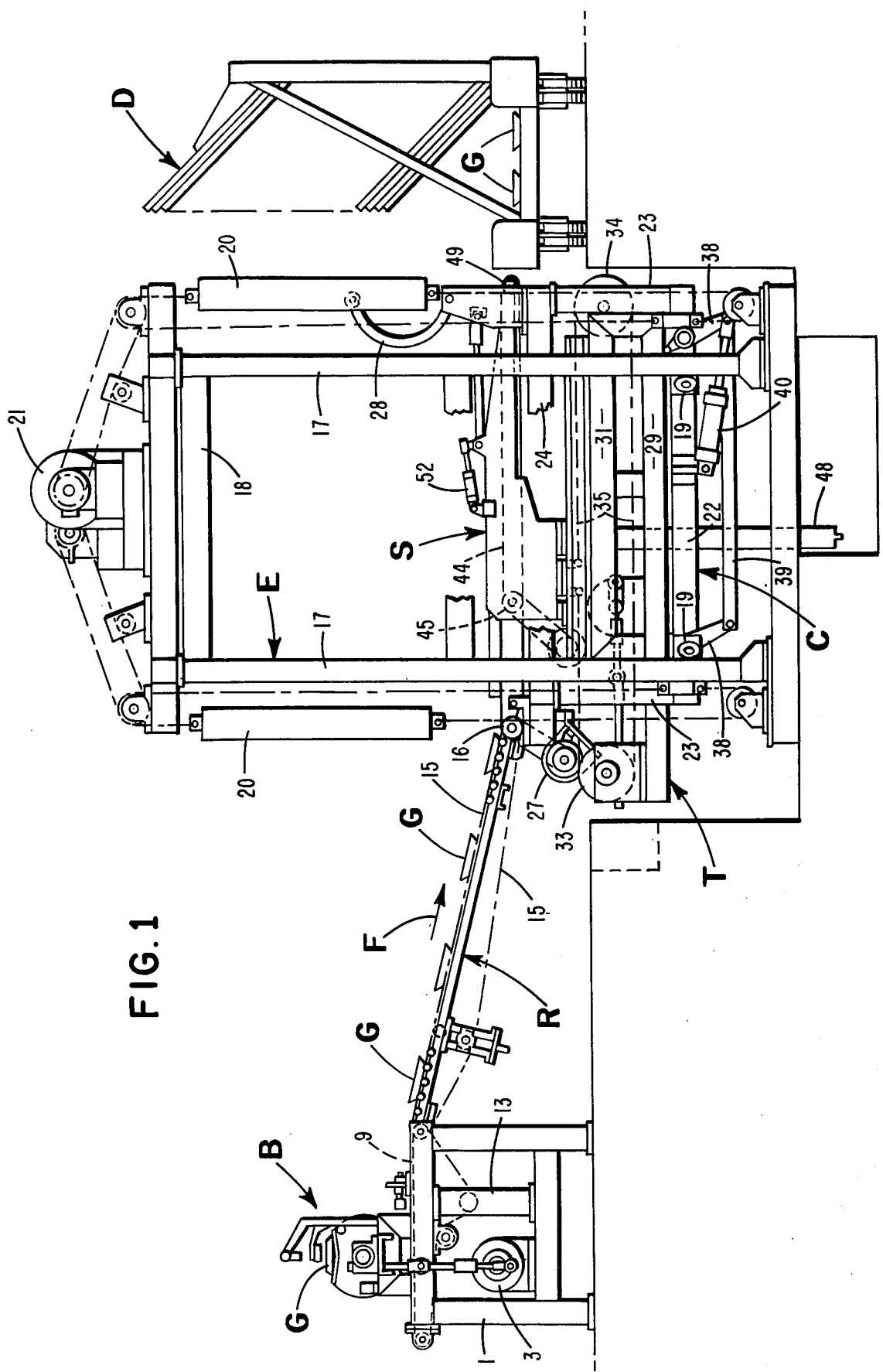

The foregoing objects and others are accomplished by providing a method for the automatic storage of sections of elastomeric material which combines the steps of:

a. taking up each of said sections from a collecting plane;

b. transferring it on a first system of conveyor belts, closed as a ring around a plurality of rollers on which the belts are mounted in parallel and spaced relationship so as to originate a surface moving with a continuous and uniform motion and, at least for a portion, positioned along a plane which constitutes a first plane for the transport of the section;

c. transporting it, by means of the motion of the first transport plane, in proximity of a storing plane, in case situated at a continuously variable height;

d. laying it on the storing plane; the method being characterized in that it further comprises the following steps:

e. transferring each section from the first transport plane on a second transport plane, not coplanar and not coincident with the first, but parallel to it and movable in the same sense at a speed higher than that of the first plane, the second plane being provided by a second system of conveyor belts, closed as a ring around another plurality of rollers, on which the belts are mounted in parallel and spaced relationship, and at the intervals between the belts of the first system;

f. driving the section, transported on the second plane, as far as the storing plane and in a position overlying the latter;

g. removing the supporting surface from under the section, namely the second transport plane, so as to initiate the fall of the section on the underlying storing plane.

The invention also provides an apparatus, working according to the described method, for the automatic storage of sections of elastomeric material on storing planes arranged if necessary at a continuously variable height, characterized in that is comprises at least:

- a first transporting device for receiving each of the sections of elastomeric material;
- a second transporting device supplied by the first device, for transporting each of the sections as far as a storing plane and in a position overlying the latter; and
- means able to originate the fall of the sections from the plane of the second transporting device on the underlying storing plane.

In greater detail, the apparatus comprises:

- a framework, firmly secured to the ground, through which of each of the sections of elastomeric material moves from the collecting zone to the storing planes, the framework having two opposite sides, orthogonal to the direction of the movement, with respect to which they take respectively the name of inlet end and outlet end;
- a carriage, movable vertically in the two senses within the framework and carrying, mounted on it, a system of conveyor belts supported by at least two rollers, rotatably mounted at the opposite ends of the carriage and defined respectively as first roller and second roller, on which the belts are mounted at mutual intervals, the belts originating a plane forming the transport plane of the first transporting device, which travels from the inlet end to the outlet end;
- a frame, mounted within the carriage, which can be displaced vertically in the two senses, with respect to it, between a lower position and an upper position;
- a slide, mounted on the frame, which is longitudinally movable with respect to it in the two senses, in the direction from the inlet end to the outlet end, between a rear and an advanced position, the slide carrying, mounted on it, a system of conveyor belts supported by at least two rollers rotatably mounted at the opposite ends of the slide and respectively defined as inlet roller and outlet roller, the outlet roller being moveover provided with means able to permit its displacement, relative to the slide, in the two senses in the direction from the inlet end to the outlet end, between two positions which define two distances, maximum and minimum, of the outlet roller from the inlet roller, whose axis is fixed with respect to the slide, the conveyor belts being mounted at intervals on the rollers, in a position corresponding to the intervals of the system of conveyor belts of the carriage, and providing a surface constituting the transport plane of the second transporting device, which travels in the same direction as the conveyor belts of the carriage, the plane having such a position as to pass through the plane of the first transporting device every time the frame is moved from the lower position to the upper position, and vice versa, means being provided for controlling the motion.

The above described apparatus can be conveniently used in a complete plant for storing sections of elastomeric material, from the taking up of the sections at a point of arrival to their storing on appropriately provided storing planes.

It is moreover known that, when the sections are tread bands, their lower surface is covered with a sheet of uncured rubber, having particular adhesion characteristics, which has the task of insuring a safe and reliable bonding of the tread band on the carcass.

However, the sheet deteriorates when it remains in contact with other surfaces, for instance the storing planes, so that it is advisable to place the tread bands to season in overturned position, namely with their surface covered with the sheet turned upward.

This operation can conveniently be carried out at the beginning of the above described storing process; therefore, a third object of the present invention is a modified method for storing sections of elastomeric material characterized in that, after the taking up of the section from the collecting plane and before transferring it on the first transporting plane, it comprises the further steps of:

blocking the section against a supporting plane;
imparting to the section, through the plane, at least a rotation about an axis lying in the plane and arranged parallel to one of the sides of the section, preferably to that having larger size, so as to invert the mutual position between the lower surface and the upper surface of the section with respect to the collecting plane; and
releasing the section from the supporting plane, the taking up, blocking, rotating, releasing, transferring, transporting and storing operations being carried out by maintaining the section always positioned in the plane defined by its two main axes.

The apparatus which carries out the overturning of the tread bands can conveniently be the same device used for receiving the sections, which will be hereinafter called "overturning bench", modified in a novel manner.

Accordingly, a forth object of the present invention is a plant for storing sections of elastomeric material on storing planes, arranged, if necessary, at a continuously variable height, provided with a device for receiving the sections, which advance on a given plane and according to a stated direction, and for their transfer on the first transporting device, characterized in that the receiving device, defined "overturning bench" comprises:

means for collecting each section coming from a given direction and for positioning it with a preestablished orientation;
means for blocking each section in the oriented position;
means for overturning each section at least about an axis parallel to one of the sides of the section, preferably the side of greater size; and
means for transferring the section, in the overturned position, on the first transporting device.

Many other features of the method and of the machines of the plant are other objects of the present invention, as for instance the operating step, and of the device for carrying it into effect, which are necessary to adjust the position of at least the second movable plane according to the continuously variable height of the storing planes.

Anyhow, the step and the device could be omitted when it is adapted on the same storing planes, whose level variations are balanced by means of appropriate movements. For instance, if "book-type" trucks are used, a vertically movable platform can be provided for supporting the loaded truck, which is continuously lowered so as to maintain the successive storing planes always at the same level with respect to the machine.

The present invention will be fully explained and better understood with the aid of the following description with reference to the attached drawings given by way of non-limiting example, which illustrate an embodiment of the complete plant for carrying out the whole process.

With reference to FIG. 1, the plane comprises a bench B for overturning a section G of a tire tread or the like, a device R for moving the section G from bench B, an elevator, constituted by a framework E, within which moves vertically a carriage C, carrying a frame T which supports a slide S, movable horizontally with respect to frame T.

Both the bench B and the carriage C comprise respectively a system of endless conveyor belts connected with a third system of endless conveyor belts on device R. An additional system of endless conveyor belts, not connected with those of bench B and carriage C, is mounted on the slide S.

The extruded sections G, taken up from the bench B are transported by device R to the endless belts of carriage C from which they are taken by the slide S to be laid on the planes of the "book-type" truck D, as will be explained in detail hereinafter.

Figure 2:
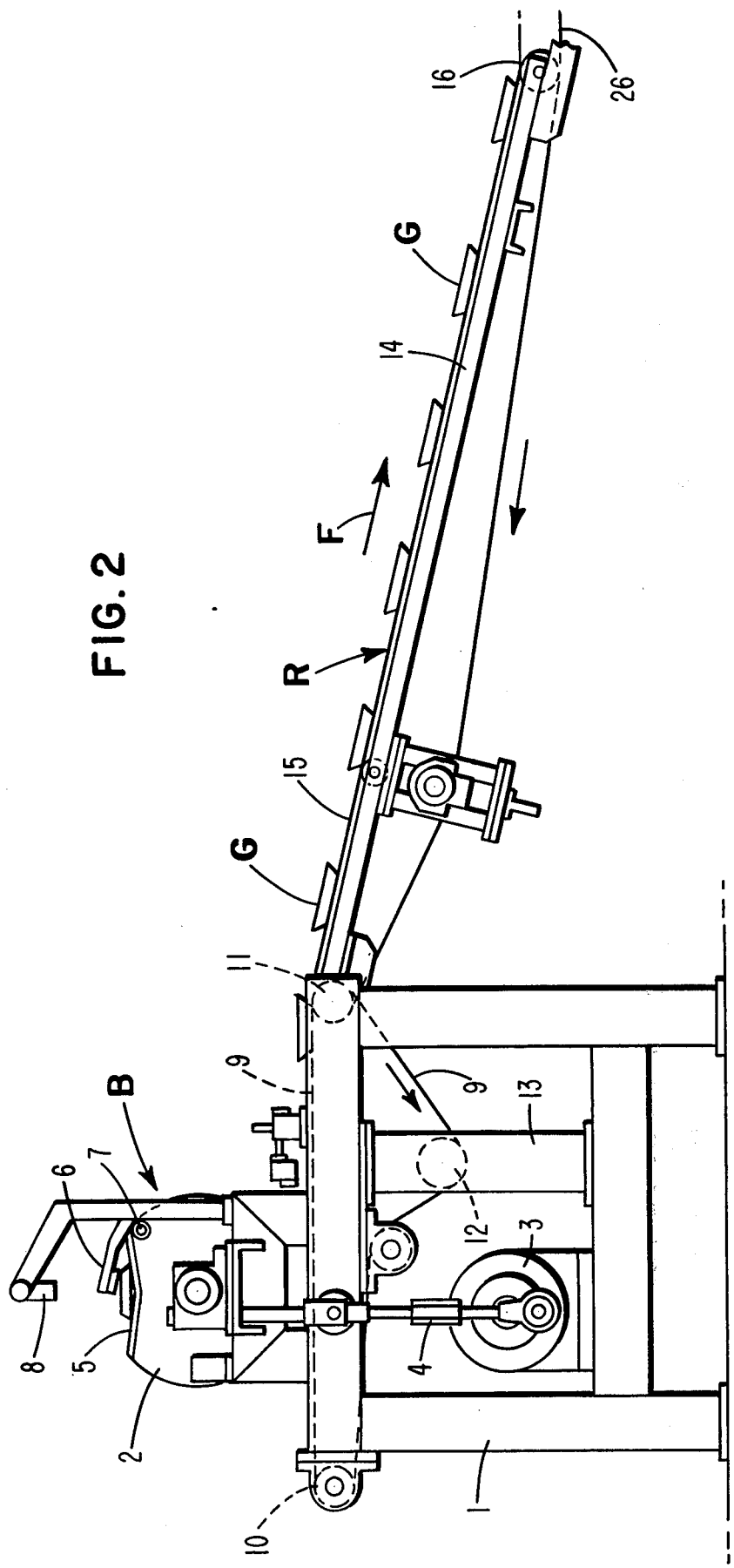
FIG. 2 represents a detailed lateral view of the overturning bench and of the section transferring device of the plant.
Figure 3:
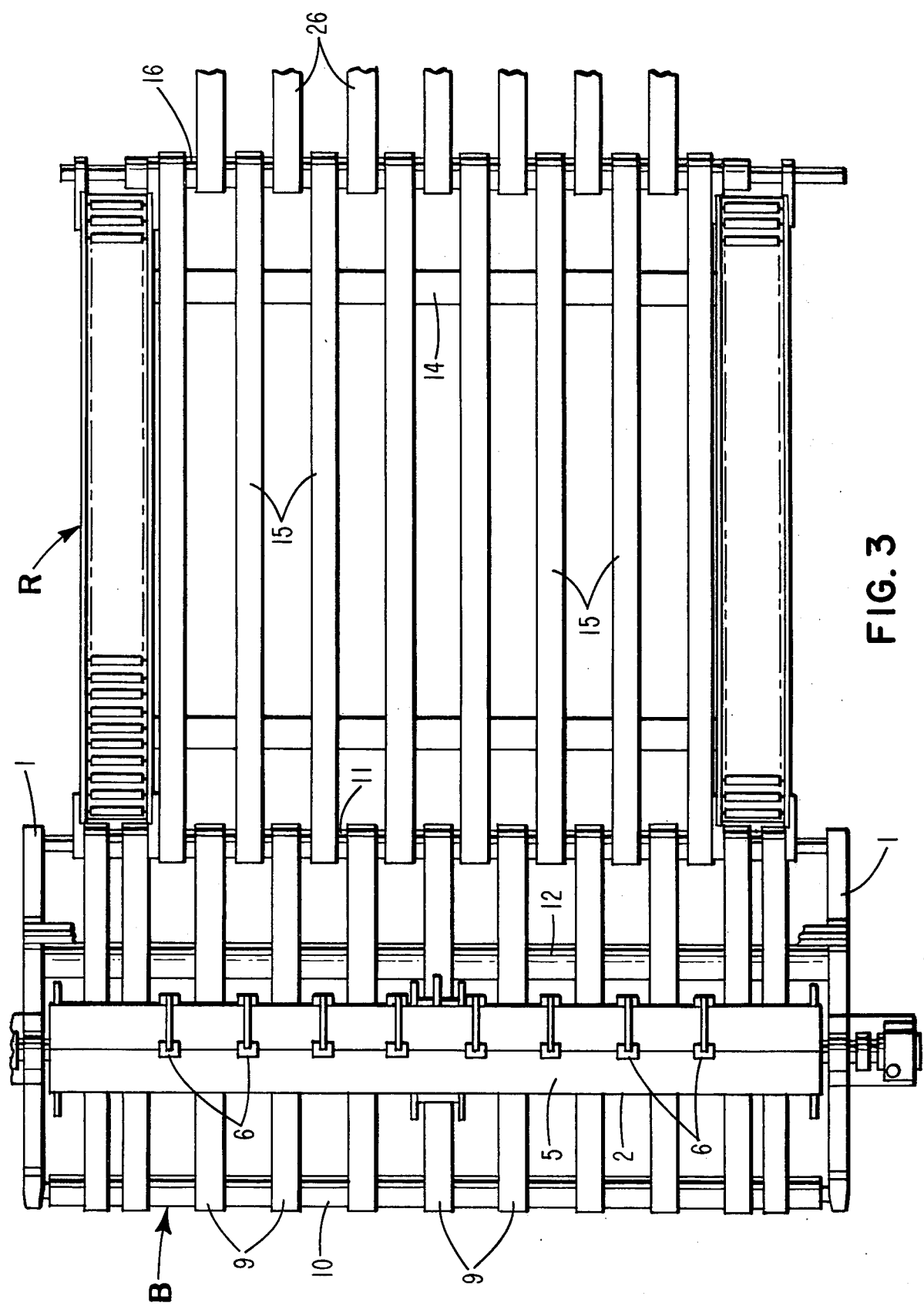
FIG. 3 represents a plan view of the system of conveyor belts of the bench and of the transferring device.

As regards FIGS. 2 and 3, the overturning bench B comprises a framework 1 supporting a cylindrical member 2 arranged horizontally and rotating about its own axis. The rotation is controlled by a motor 3 fixed on framework 1 by means of a crank-lever system 4.

The surface of development of the cylindrical member 2 shows in two diametrically opposite zones a surface 5 constituted by two half-planes mating along a side parallel to the axis of the cylindrical member 2 and forming together a concavity directed towards the outside of cylindrical member 2. The half-planes are obtained with two ball-supported planes which constitute the sliding plane for the section G and their common side forms the prolongation of the direction of arrival of the sections G.

The cylindrical member 2 carries moreover, one for each surface, two pliers devices for holding the section G against the surfaces. These devices have a series of levers 6 each of which has one end which pivots along an axis of rotation 7. The levers can rotate about their axis of rotation until their other end is brought against the surface 5, at the side common to the two ball-supported planes.

In a position overlying cylindrical member 2, at the surface 5, a sensing element 8 is provided, for example, a photocell, able to detect the position of the section G, and to which the controls for the movement of the pliers and of the cylindrical member 2 can be usefully connected.

The framework 1 carries a system of conveyor belts 9, whose transport plane lies below cylindrical member 2, with a direction of movement orthogonal with respect to the axis of rotation of cylindrical member 2 in the direction indicated by the arrow F. Endless conveyor belts 9 are arranged transversely in series and parallel to one another at certain spaced interval. The belts 9 are looped about a series of rollers, one of which, 10, is defined as "front roller" and is mounted on the framework 1 of the bench B with its axis fixed with respect to the latter. Another roller, 11, situated at the other end of the transporting plane, and defined a "back roller", is mounted on the bench B in such a way that its axis may translate, parallel to itself, with respect to the bench B, in the two directions of movement of the belts 9.

The displacement of the back roller creates a surplus in the length of the belts 9 with respect to the position of maximum distance between rollers 10 and 11, the surplus being taken up by an idler roller 12, slidable within vertical guides 13 fast with the framework of bench B and supported by the same belts 9 of the system.

The idler roller, because of its weight drops downwardly to compensate for the surplus of length of the belts 9 caused by displacement of the roller 11 towards the roller 10. The idler roller is lifted to restore the surplus of belts 9 when roller 11 is displaced away from roller 10.

The above described take-up bench B is connected with the elevator by means of the already indicated transferring device R.

The device R has a frame 14 supporting a system of endless belts 15, arranged side by side parallel to one another at spaced intervals and rotatable in the direction of the arrow F about a series of rollers, one of which, 11, is the same roller already considered, which is also common to the system of belts 9 of the bench, while roller 16, situated at the other end of the frame, is mounted also on carriage C, as will be better explained below, and is common to the system of belts mounted on the carriage.

Substantially for this reason the belts constituting the above described systems are mounted at transversely spaced intervals on the respective supporting rollers in order to allow the assembling of two different systems of belts on a common roller. In fact, it is clear and readily apparent from FIG. 3 that on a common roller the belts 9 and 15 are inserted in "comb-like" fashion, namely the belts of one system are interrelated with those of the other system, so as to provide a sliding plane without interruptions and with the component belts moving at the same speed.

The intervals between the belts 9 of the overturning plane have moreover the purpose of allowing the pliers above cylindrical member 2 to pass through the transporting plane of the belt system. The component levers are in fact secured to the cylindrical member 2 at the intervals between the belts 9, so that, during the rotation of member 2, they do not interfere with the belts themselves.

Figure 4:
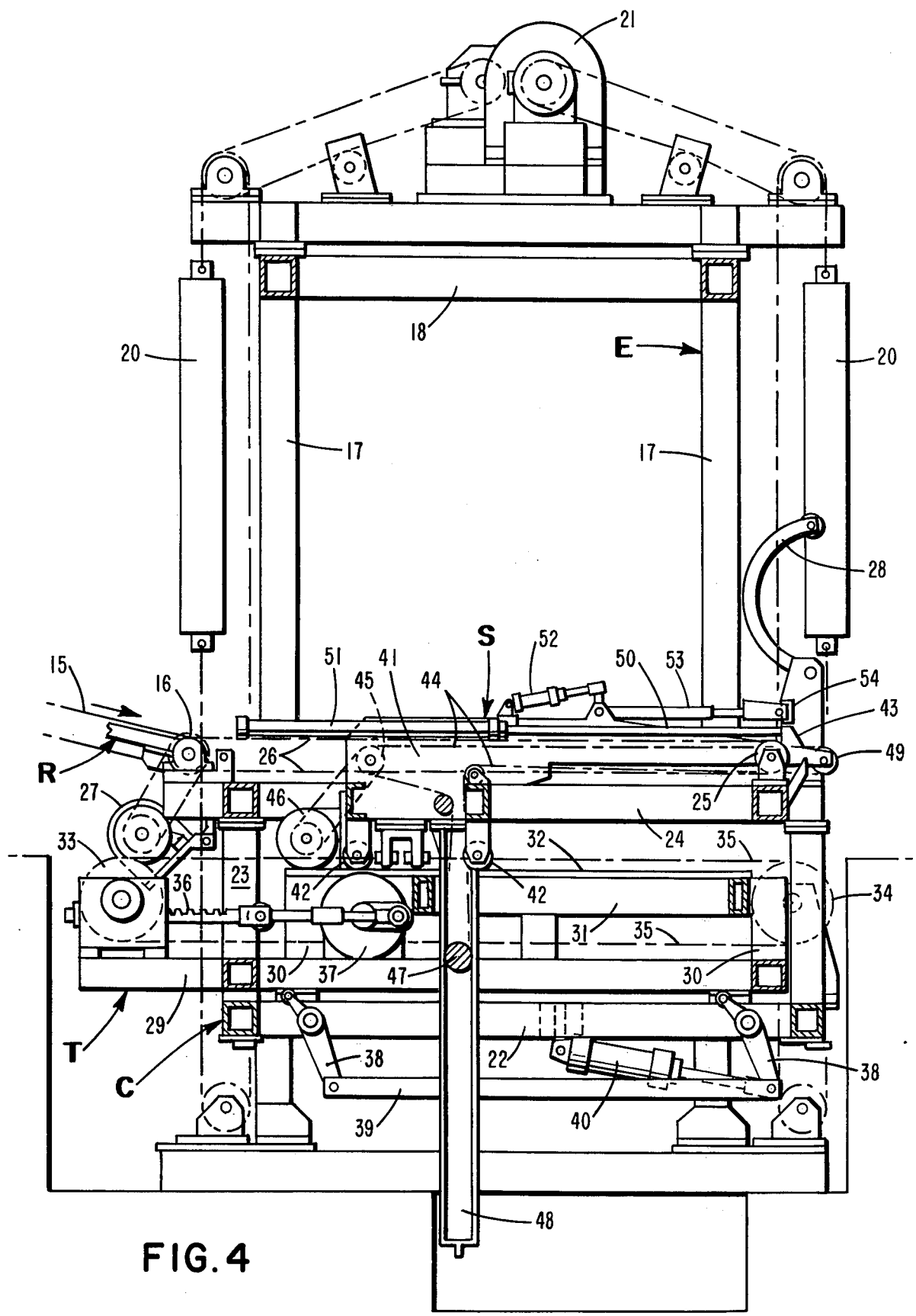
FIG. 4 represents an open lateral view of the section storing apparatus of the plant.
Figure 5:
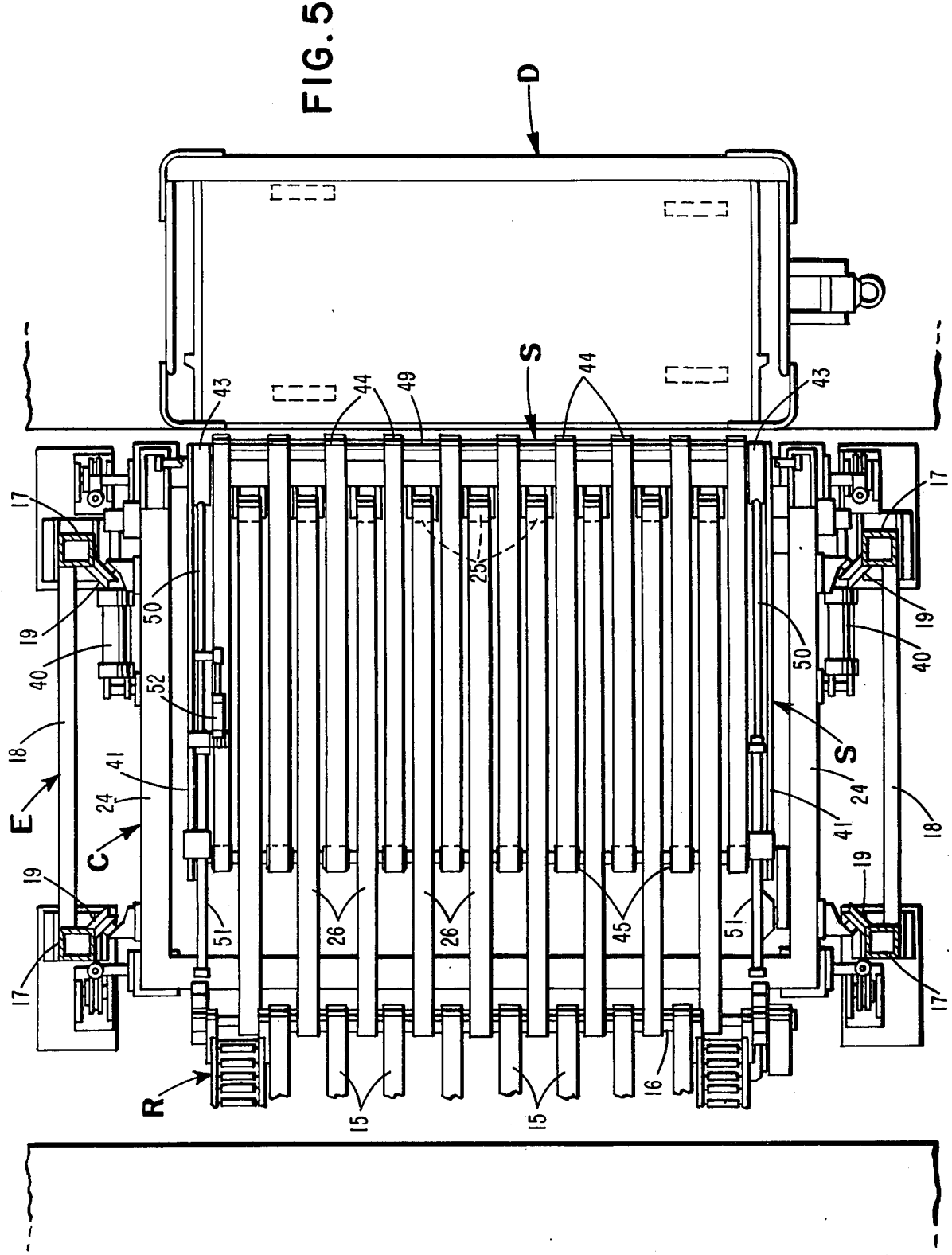
FIG. 5 is a plan view of the systems of conveyor belts of the carriage and of the slide.

As regards the elevator, FIGS. 4 and 5, it comprises a frame E formed by four pillars 17, connected by crossmember 18.

The side of frame E connected with the section transferring device R (at the left of FIG. 4) is called the inlet end, while the opposite side, facing the book-type truck D, is called the outlet end.

A carriage C moves within frame E in a vertical direction, by means of four sheaves 19 situated at the four corners of the carriage C (FIG. 5), which travel on the rail constituted by the inner corner of the four pillars 17.

The carriage C is balanced (FIG. 4) by means of counterweights 20, and its motion is controlled by a motor-reducer unit 21 positioned on the top of the frame E.

Carriage C has a rectangular frame formed of a horizontal base of four beams 22 fixedly connected with one another. The base carries, fastened to it, four columns 23 which support a second horizontal base formed by four beams 24, fixedly connected together and with the columns 23.

The base 24 carries, fixed at one of its ends, a roller 16 as indicated above and defined as "first roller" and, at the opposite end, near the outlet end, another roller 25 defined as "second roller". The rollers support a system of conveyor belts looped thereabout formed by a series of belts 26, mounted parallel and at spaced intervals across the rollers, as described above.

The roller 16, which controls the movement of the three systems of belts 9, 15, 26, respectively, of the bench B, of the transferring device R and of the carriage C, is connected with a motor 27 fixed on a flange integral with the base 24.

The two beams 22, parallel to the direction of motion of the belts 26 are connected with the counterweights 20. On each of them are, moreover, fastened two sheaves 19 which travel along the inner corners of the pillars 17.

At the outlet end of the base 24 there is moreover mounted an arm 28 rotating in the vertical plane parallel to the direction of motion of the belts 26 about one of its ends, the other end of said arm interfering with the trajectory followed by the planes of the book-type truck D when these pass from the unloaded to the loaded position.

A frame T (FIGS. 1 and 4), having a horizontal base formed with four beams 29 integrally connected together, leans on the base 22.

Base 22 carries columns 30 which sustain horizontal beams 31 on which are mounted two metallic profile bars 32 constituting the rails for the slide member S.

The base 29 carries moreover two sprocket wheels 33 and 34, each at one end, about which is looped a chain 35 constituting the dragging element for the slide S, to which chain 35 is secured; it is in fact to be taken into account that slide S is movable horizontally in the same direction as the belts 26.

For this purpose, the sprocket wheel 33, is integral with a coaxial gear, which engages with a rack 36 alternatively actuated in the two senses, by means of a connecting rod, by a motor 37 fixed to the frame.

The frame is simply leaning on the base 22 and can be lifted with respect to it; the movement is guided by shoe systems, not shown in the figure or other conventional type.

The lifting and the consequent lowering of the frame T are obtained with an articulated system constituted by levers 38 pivoted on the beams 22 in such a way that, in rest position, they have one of their ends in contact with appropriate abutting surfaces of the base 29 and their opposite ends connected together by means of two bars 39, as clearly illustrated in FIG. 4.

The stems of double-acting cylinders 40, also hinged to the beams 22, are connected to one end of each bar.

As suggested above, a slide S is connected to the tracks 32 of the frame, and it travels on the tracks in the same direction as the belts.

The slide S is substantially constituted by a frame formed with two flanges 41 arranged along vertical planes, parallel to the direction of motion of the slide, and connected transversally to each other. The slide is movable on the tracks 32 by means of wheels 42 and is connected with the dragging chain 35.

The flanges, in their part directed towards the outlet end of the frame, have for a certain portion a shape forming the guide along which moves a small truck 43.

Moreover, the flanges 41 are transversally connected by the axes of a series of rollers, around which turns, closed as a ring, a system of conveyor belts 44 obtained, like those already illustrated, with belts 44 arranged parallel at spaced intervals, and corresponding to the intervals of the belt system 26 of carriage C.

The transport plane of the system of belts 44 coincides with a plane parallel to the transport plane of the belts 26; however, it is disposed below the latter and the distance between the two planes is smaller than the maximum superelevation which the frame T can take with respect to carriage C.

One of the rollers of the slide, 45, defined as the inlet roller, is connected to a motor 46, fast with the frame of the slide, and controls the movement of belts 44.

Belts 44 are looped about four rollers, one of which is free to move within a vertical guide 48 fixed inferiorly to the slide and directed downward, and is supported by the conveyor belts which wrap it in a way quite similar to that described with respect to the analogous device of the overturning bench.

Another roller 49, defined as the outlet roller, is mounted on the above indicated small truck 43; the latter is moreover connected to the stems 50 of double-acting cylinders 51 fast with the flanges 41.

Finally, the last two rollers are usual return rollers.

The "inlet roller" and the "second roller" have a particular shape: in practice they are constituted by shafts on which are keyed, at intervals, pulleys having approximately the same width of the belts supported by them and a free height, corresponding to the difference between the diameter of the pulley and the diameter of the shaft, which height is greater than two times the maximum vertical displacement of the frame with respect to the carriage C.

The flanges of the slide carry moreover, mounted onto them, two double-acting cylinders 52, whose stems are each connected to one end of a square 53 fulcrumed on the flange 41 and bearing at the other end a magnet 54 hingedly mounted on the end so as to allow it to carry out a partial rotation about the end. The magnet is then brought against the lower surface of the planes of magnetic metal of the book-type truck D, which is at a standstill in front of the outlet end of the plant, and serves to move the plane from the rest position to the loaded position, as will be explained in detail hereinafter.

Coming now to consider the operation of the plant, the cycle starts when a section of extruded material coming for instance from the extrusion plant slides on the surface 5 of the bench B, which surface is provided, as said above, with two ball-supported planes.

The concavity created by the two planes has the consequence that the section G takes a position parallel to the axis of cylindrical member 2, while the sensing element 8, actuated by the section G itself in reaching a pre-established position along the ball-supported planes, controls the closure of the pliers 6 which clamps the section G against the surface 5. At this moment, cylindrical member 2 rotates about its axis until it brings the section G on the conveyor belts 9 and, as easily ascertained, in overturned position with respect to the position of arrival on the bench B.

By means of this movement, the surface of cylindrical member 2 which is diametrically opposite to that on which the section G lies, and which is quite equal to the first, occupies the position left free from the latter and is therefore ready to receive the next section.

Of course, when the sections G arrive in a continuous and uniform manner and are very near or even mutually mating, just as in the case of the extrusion plant, before the bench B a section G spacing device, well known to the technicians, shall have to be provided, so that sections G may reach the bench at intervals sufficient to allow the rotation of cylindrical member 2 without giving rise to interference phenomena.

As soon as rotation of cylindrical member 2 has been started, the pliers 6 open, the section, now overturned with respect to its initial position, comes into contact with the conveyor belts 9 which drag section G away, bringing it on the conveyor belts 15 of device R, which in their turn transport it on the conveyor belts 26 of carriage C.

Carriage C is situated in the frame E, at such a level that the transport plane of the slide S, formed by the belts 44 of the slide, lies at a level higher than the level of the plane of the carriage on which the section G or several sections G, if necessary, will be stored.

The carriage, as said, supports a frame T vertically movable with respect to it between two positions, a lower one and an upper one, with respect to the transport plane of the belts 26.

At this moment the frame is in its lower position, and therefore is directly leaning on carriage C.

The frame supports a slide provided with a system of conveyor belts 44.

The slide is horizontally movable with respect to the frame in the direction of the inlet end-outlet end, between two positions, respectively defined as rear and advanced ends.

Moreover, also the outlet roller 49, which supports the system of belts of the slide, is movable with respect to the latter in the two senses of the same direction of motion of the belts, since it is mounted on the small truck 43. The limit positions of the displacement define two different lengths of the conveying plane provided by the belts 44. The lengths are respectively defined as maximum and minimum.

At this moment (FIG. 4), the slide is in its rear position and with the conveying plane 44 at its maximum length, namely with roller 49 in the outermost position. In this position the transport plane of the slide remains contained within the base area of the framework E.

Considering again the section, or the group of sections G travelling on the system of belts 26, at a certain time it is in a position corresponding to the underlying transport plane of the slide.

Now the system of belts 44 is actuated and at the same time cylinder 40 is started, so that the levers 38 rotate and interfere with the abutting surfaces provided on the base 29 of the frame T, originating in this way the lifting of the frame.

In consequence of the lifting, and by virtue of the particular shape of the rollers 25 and 45, the transport plane of the slide passes through the plane of the carriage and stops at a higher level, obviously dragging with it the section G or sections G which were situated in the carriage.

As already said, the shape of the rollers 25 and 45 is such as to avoid any interference phenomenon during the movements of crossing of the planes.

Figure 6:
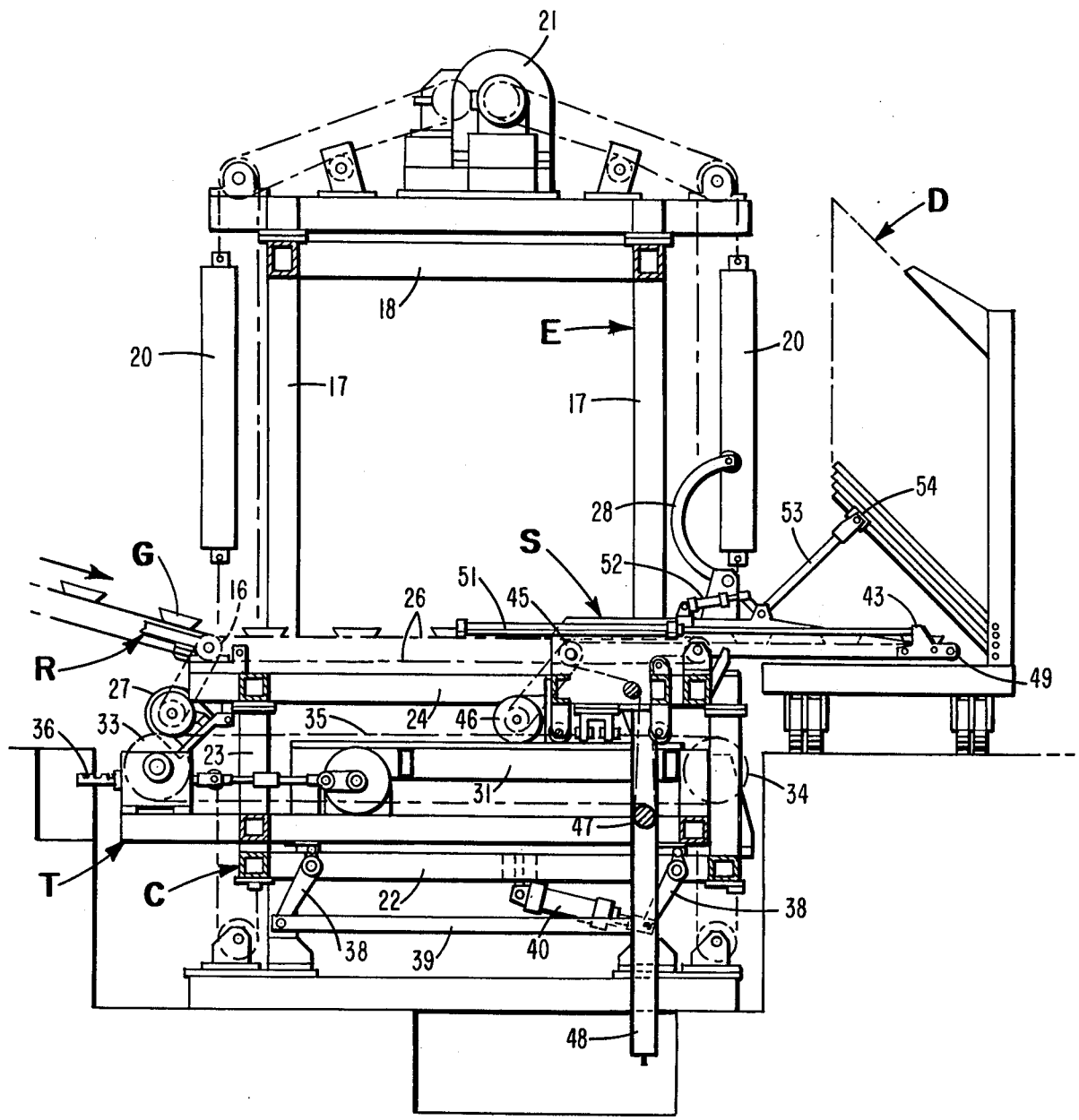
FIG. 6 is the section storing apparatus during a step of the operating cycle, with the slide in advanced position and the outlet roller at its maximum distance.

Now the section is situated on the transport plane of the slide moving towards the outlet end of the elevator. However, also the slide, by actuation of the motor 37 and therefore of the system constituted by the rack, the gear, the sprocket wheel and the chain, is simultaneously moved to its advanced position, so that its end carrying the small truck 43 extends above the storing plane of the book-type truck (see FIG. 6).

It is again pointed out that the plane can obviously be any storing plane, not only that of the book-type truck, but also, for instance, the initial station of a successive processing plant.

In consequence of the combined transport movement of belts 44 and of the translation movement of the slide, also the section of elastomeric material or the foreseen number or sections at a certain moment come to be situated above the storing plane.

Meanwhile, cylinder 52 has been actuated, so that the square 53 has brought the magnet 54 hinged to its end against the overlying storing plane of the book-type truck, which plane is still in rest position, and is retained in said position by the appropriate above cited return spring.

Now, the movement of the belts 44 is stopped, and at the same time the frame (T) is brought again to its lower position, originating therefore the lowering of the slide and the re-crossing of the transport plane of the carriage by the transport plane of the slide. Of course, the section is now quite out of the base area of the elevator, above the storing plane, so that it does no longer interfere with the transport plane of the carriage. Moreover, the lowering is not sufficient to create an interference between the end of the slide, protruding out of the elevator, with the storing plane of the book-type truck.

Figure 7:
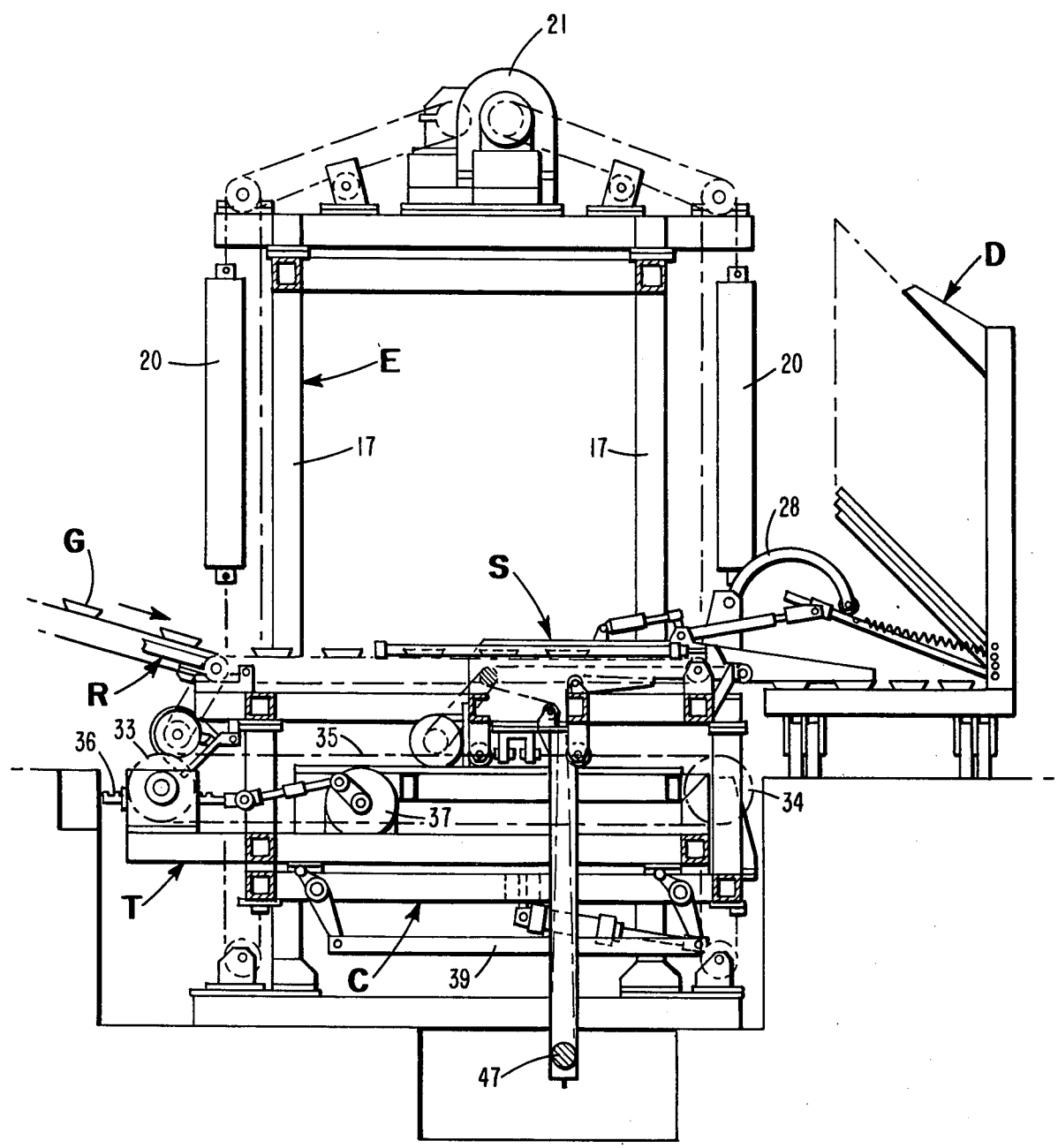
FIG. 7 illustrates the section storing apparatus during a subsequent step of the operating cycle, with the slide in an intermediate position during its return stroke, the outlet roller at its minimum distance and a device for the alternation of the storing planes in working position.

At this moment (FIG. 7), while the slide and therefore also the axis of the inlet roller 45 remain stationary in the position they have, cylinder 51 is actuated, so that the small truck 43 and consequently the outlet roller 49 move towards the inlet roller 45 until the position which corresponds to the minimum length of the transport plane 44 is reached. In consequence of the movement, the transport plane is progressively removed from below the section or sections G, so that the latter, no longer supported, fall on the underlying storing plane of the truck.

It is intuitive to note that the surplus of belts which is due to the movement of the small truck 43 is recovered by roller 47, which falls downward within its guide 48, so that the tension of the systems of belts 44 can be kept constant.

The slide is now brought again in its rear position by starting again motor 37, while the small truck 43 is brought again in its outer position by actuating cylinder 51 in reverse sense and by restoring again the maximum length of the transport plane of the slide. The roller 47 re-ascends within the guide 48, being lifted by the belts 44 which are dragged by roller 49.

Meanwhile, the return movement of the slide, through the magnet situated at the end of the lever 53, which has adhered to the lower surface of the first, overlying storing plane of the truck, has caused the downward movement of the plane. Now, before the magnet detaches from the plane in consequence of the complete return of the slide, arm 28 is actuated which, rotating, brings its free end on the upper surface of the storing plane and, overcoming the action of the known return springs, compels the storing plane to complete its downward movement as far as the horizontal position of stable equilibrium, where it can be left, which corresponds to the position of loaded plane. Obviously, any other suitable device, for instance a pneumatic system, can be used in place of the magnet, when the truck planes are made of non-magnetic material.

This successive storing plane is situated at a level higher than that of the preceding plane, so that the motor-reducer 21 can now act, moving the carriage C upward for an interval corresponding to the difference of level between the just loaded and the next storing plane.

In consequence of the rigid connection between the rollers 16 and 11, constituted by the transferring device R, the roller 11 moves now horizontally on the frame of the bench B and the surplus of belts due to the movement is recovered by roller 12, movable within its vertical guide 13, so that the tension of the system of belts 9 is kept constant.

At this moment the plant is ready to begin a new cycle.

As said above, it is pointed out that the last part of the plant can be substituted by an appropriate device, for instance a movable platform supporting the book-type truck, which may adjust the level of the storing plane to the fixed outlet height of the elevator, namely of the transport plane of the slide.

Of course, when the storing truck is filled, the carriage C is brought again to its lower position, and an empty truck is brought in front of the outlet of the plant.

Reconsidering now the working cycle, it can be noted that the sections reach carriage C in a continuous and uniform manner at spaced mutual intervals; it has already been said that, according to their size, several sections can be stored on a plane of the book-type truck; in the following description, the expression "group of sections" will mean the number of sections which finds place on a plane of the book-type truck.

It is then to be observed that the slide has lifted with respect to carriage C when the whole group of sections is situated in correspondence of its conveyor belt.

Moreover, the slide has to return to the lower position in a time not longer than that taken by the first of the sections of the next group to cover the distance run by the slide, to pass from the rear position to the advanced one. In fact, in the contrary case, the section, travelling on the belts of carriage C, will interfere with the pulleys of the roller 45 still in raised position with respect to the belts of the carriage.

Further, it must carry out its working cycle in a time shorter than that taken by the first section of the second successive group to arrive at the belts of the slide in the rear position. Otherwise, in the next cycle, the slide would pick up a greater number of sections, which therefore would find no place on the storing planes.

In practice, the absolute speed of displacement of the sections on the slide must be very high in comparison with the speed of the group of belts 9, 15, 26 and it is obtained by imparting a high speed both to the belts 44 of the slide and to the latter, so that the sum of said speeds provides the high value of absolute speed required for the operation of the present apparatus.

It is to be understood that this explanation is given only by way of illustrative example and that any modification of the present inventive concept may be made by the technicians of this field without departing from the scope of the invention except as it may be limited by the claims.

What I claim is:

1. An apparatus for automatically transferring a plurality of separate objects which may be in a plastic condition, either individually or in groups of two or more elements between a collecting plane and a storing plane, said storing plane belonging to a structure presenting a plurality of identical storing planes each one movable from an inclined position to a horizontal one, and being vertically apart one from the other when in said horizontal plane, said apparatus comprising
    a first transporting device, vertically movable, provided with a first supporting surface, mobile in a given direction, capable of receiving said section or sections of said collecting plane and to transport it or them to the vicinity of said storing plane,
    a second transporting device, alternatively movable in both senses of said given direction, between said first transporting device and said storing plane, provided with a second supporting surface, capable of receiving said section or sections, from said first supporting surface, mobile in said given direction, the dimension of which in said direction, defined as length of the surface, is sufficient to contain the maximum number of said sections which must be deposited on said storing plane,
    devices, for carrying into effect the transferring of said section or sections, from the first supporting surface to said second supporting surface wherein said second supporting surface is disposed under said first supporting surface, at least partially in correspondence with the latter, means to displace said second surface from said underlying position to an overhanging position with respect to the first surface and means to allow the second supporting surface pass through the first one every time said second surface is displaced between said underlying and overhanging positions,
    means to regulate said alternative movements of said second transporting device with respect to the first one,
    means to regulate the movements of said second supporting surface,
    means to regulate the length of said second supporting surface, said means being able to transport said section, or sections, above said storing plane, to stop it or them in a position, fixed with respect to said storing plane, above it, and to remove said second supporting surface from below the section, or sections, whereby the or these latter no longer supported, falls or fall on said underlying storing plane.

2. The apparatus of claim 1 comprising:
    a framework, firmly secured to the ground, through which each of said sections of material in a plastic condition moves from the collecting plane to the storing plane, said framework having two opposite sides, orthogonal to the direction of said movement with respect to which they take respectively the name of inlet end and outlet end,
    a first carriage, constituting said first transporting device, movable vertically within said framework and carrying, mounted on it, a system of conveyor belts supported by at least two rollers, rotatably mounted at the inlet and outlet end of said carriage and defined respectively as first roller and second roller, on which said belts are mounted spaced apart one from the other, said belts providing a plane forming said first supporting surface of said first transporting device, which travels from the inlet end to the outlet end,
    a frame, mounted within said carriage, which can be displaced vertically with respect to it, between two positions respectively defined as a lower position and an upper position, a slide, constituting said second transporting device mounted on said frame, longitudinally movable with respect to it in both senses, in the direction from the inlet end to the outlet end, between a rear and an advanced position, said slide carrying, mounted on it, a system of conveyor belts supported by at least two rollers rotatably mounted at the opposite end of the slide and respectively defined as inlet roller and outlet roller, said conveyor belts originating a plane constituting said second supporting surface of the second transporting device, which travels in the same direction as the conveyor belts of the carriage, said inlet roller being disposed between said first and second roller, said conveyor belts of the slide being mounted, on said inlet and outlet rollers, spaced apart one from the other, in a position corresponding to the intervals of the system of the conveyor belts of the carriage, said inlet and second rollers being each constituted by a number of pulleys equal to the number of the respective conveyor belts wound up onto them, said pulleys being mounted in coaxial arrangement on a shaft and spaced apart one from the other at a distance not smaller than the width of the conveyor belts of the other system, and having a diameter not smaller than the sum of the thickness of said connection shaft with the double value of the maximum displacement between said frame and said carriage, said second supporting surface being in such a position with respect to the first one as to pass through the latter every time said frame is displaced from said lower to said upper position and vice-versa, whereby said sections of material are transferred from the first transporting device to the second transporting device, means for carrying into effect said vertical displacement of the frame, means capable of positioning a second storing plane into a position above the preceding plane, when this latter is occupied by said sections, means able to regulate the movements of said slide on said frame, means able to regulate the movements of the system of the conveyor belts of said slide, means able to allow the displacement of said outlet roller relative to the slide in both senses in the direction from the inlet end to the outlet end, between two positions which respectively define two distances, maximum and minimum, of said outlet roller from said inlet roller, whose axis is fixed with respect to the slide, and consequently define two lengths, respectively maximum and minimum, of said second supporting surface, and means being to eliminate and to restore the surplus of the length of the belts which takes place in consequence of said displacement of the outlet roller, in order to keep constant the tension of said belts.

3. The apparatus of claim 2 wherein said framework carries means for actuating said first carriage at a variable speed.

4. The apparatus of claim 3 wherein said actuating means permit at least two different speeds of displacement of said carriage, one of lower value for the upward movement and one of higher value for the downward movement.

5. The apparatus of claim 2, wherein said devices for carrying into effect said vertical displacement of the frame comprises levers pivoted on said carriage in such a way as to rotate in vertical planes, and in such a point as to create two arms of different length, so arranged that the arm of said levers, of smaller length, during its rotation about said pivot interferes for a certain arc of circle with abutting surfaces appropriately obtained on said frame, said levers being moreover hinged, in the end of the arm of greater length, to the stems of double-acting cylinders connected to said carriage.

6. The apparatus of claim 2 wherein said frame carries the means for the regulation of the movements of said slide on the frame.

7. The apparatus of claim 6 wherein said means comprise:

two sprocket wheels rotatably mounted at the opposite inlet and outlet ends of said frame, a chain, closed as a ring about said sprocket wheels and connected to said slide, one of said wheels being integral with a gear, coupled to a rack, said rack being connected, through a crank - lever device, to a motor, also integral with said frame, by means of which said rack is alternatively displaced in two senses, whereby the latter impart alternate rotation to the sprocket wheels fast with said gear, and consequently an alternate movement of the slide with respect to the frame.

8. The apparatus of claim 2 wherein the means able to regulate the movements of the system of conveyor belts of the slide comprise a motor connected with said inlet roller and fast with the slide.

9. The apparatus of claim 2 wherein the means able to allow the relative displacement between the outlet roller and the slide comprises a second carriage, movable on rails appropriately provided on the frame of said slide, said outlet roller being rotatably mounted in said carriage, said carriage being connected to the stems of two double-acting cylinders fast with the frame of the slide.

10. The apparatus of claim 2 wherein the slide carries devices capable of controlling said subsequent alternation of the storing planes.

11. The apparatus of claim 10 wherein said devices comprise levers pivoted to the frame of the slide, which carry at one end means for adhering to said storing plane, when in inclined position, and have their other end connected to the stems of double acting cylinders, also integral with the frame of the slide.

12. The apparatus of claim 2 wherein said carriage carries devices cooperating with those provided on said slide for carrying into effect said alternation of the storing planes.

13. The apparatus of claim 12 wherein said devices comprise an arm pivoted about one of its ends to the outlet end of said first carriage, rotating in a vertical plane, so that the other end of said arm interfere with the trajectory followed by the storing planes moving from the inclined position to the horizontal one.

* * * * *

UNITED STATES PATENT AND TRADEMARK OFFICE
CERTIFICATE OF CORRECTION

PATENT NO. : 4,062,458
DATED : December 13, 1977
INVENTOR(S) : SILVIO MANINI and ANTONIO PACCIARINI It is certified that error appears in the above-identified patent and that said Letters Patent are hereby corrected as shown below:

In the Abstract, line 10, "belt" should read -- belts --.

Column 5, line 43, "These devices ..." should begin a new paragraph;

line 44, "has" should read -- have --;

line 45, after "7", insert -- , parallel to the axis of the cylindrical member 2 --;

line 61, "interval" should read -- intervals --.

Column 12, line 1, "enting" should read -- senting --.

Signed and Sealed this

First Day of August 1978

[SEAL]

Attest:

RUTH C. MASON
Attesting Officer

DONALD W. BANNER
Commissioner of Patents and Trademarks